(12) United States Patent
Shouno

(10) Patent No.: US 8,149,443 B2
(45) Date of Patent: Apr. 3, 2012

(54) IMAGE FORMING APPARATUS AND ANALYSIS METHOD

(75) Inventor: Hiroki Shouno, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 758 days.

(21) Appl. No.: 12/264,824

(22) Filed: Nov. 4, 2008

(65) Prior Publication Data

US 2009/0119550 A1   May 7, 2009

(30) Foreign Application Priority Data

Nov. 6, 2007   (JP) ................. 2007-289047

(51) Int. Cl.
 *G06F 3/12* (2006.01)
 *G06T 5/00* (2006.01)
(52) U.S. Cl. ..................... 358/1.15; 358/3.26
(58) Field of Classification Search ............... 358/1.15, 358/1.18, 404, 444, 405, 3.26
 See application file for complete search history.

(56) References Cited

U.S. PATENT DOCUMENTS

| | | | |
|---|---|---|---|
| 2002/0001100 A1* | 1/2002 | Kawanabe | 358/1.15 |
| 2005/0063473 A1* | 3/2005 | Koyama et al. | 375/240.27 |
| 2006/0156208 A1* | 7/2006 | Sawaguchi et al. | 714/794 |
| 2008/0106465 A1* | 5/2008 | Suzuki | 342/367 |

FOREIGN PATENT DOCUMENTS

| | | | |
|---|---|---|---|
| JP | 404119421 | * | 4/1992 |
| JP | 2004-362386 A | | 12/2004 |

* cited by examiner

*Primary Examiner* — Jerome Grant, II
(74) *Attorney, Agent, or Firm* — Canon U.S.A., Inc. IP Division

(57) ABSTRACT

A sufficient number of packets necessary for analysis of a fault in a network communication apparatus are obtained. A multi function peripheral (MFP) temporarily stores received packets as a file for every print job, and stores communication failure information as a log (communication failure log). The MFP deletes data in which no error has occurred in an application among the stored files. Then, in a case where an error has occurred during processing of a certain print job, the MFP stores received packets in a storage device, and compares a communication failure in the job packet in which the error has occurred with a communication failure in packets associated with all the received print jobs. As a result of the comparison, the MFP extracts a communication failure in only the job packet in which the error has occurred, and creates a log so that the extracted result can be identified.

11 Claims, 13 Drawing Sheets

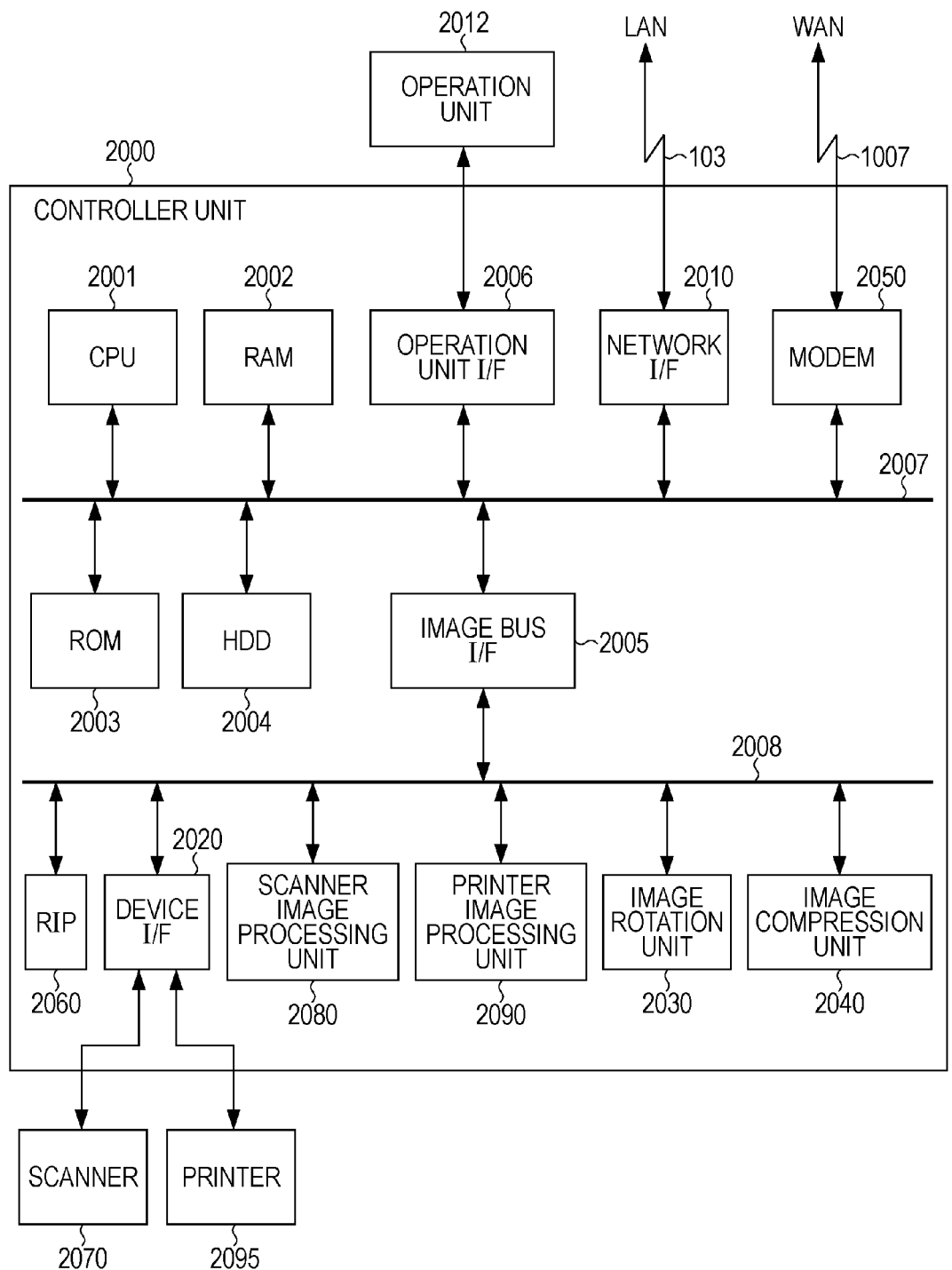

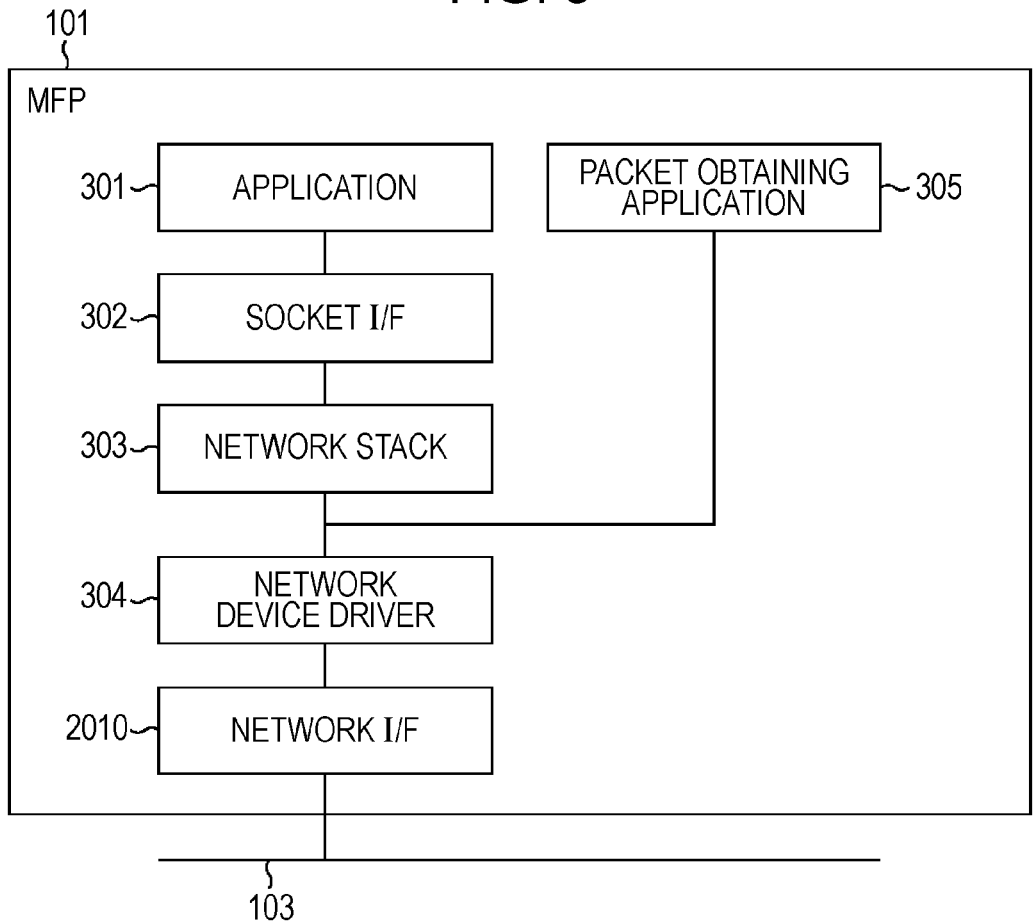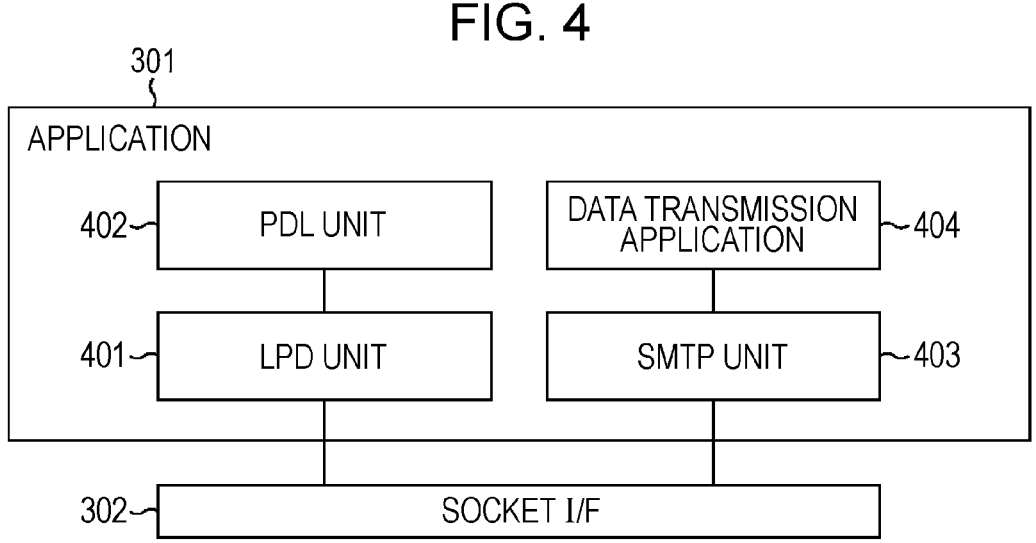

| CONTENT OF PDL ERROR | POSSIBLE COMMUNICATION FAILURE | |
|---|---|---|
| SYNTAX ERROR | BUSY<br>TIMEOUT | 901 |
| DECODING ERROR | CHECK ALL PACKETS | 902 |
| GARBLED CHARACTER | CHECK ALL PACKETS | 903 |
| JOB TIMEOUT | NO-COMMUNICATION PERIOD MORE THAN OR EQUAL TO THRESHOLD VALUE DUE TO PDL JOB TIMEOUT | 904 |

| | COMMUNICATION FAILURE LOG 1010 | ERROR JOB PACKET 1020 | ABNORMAL OCCURRENCE TENDENCY 1030 |
|---|---|---|---|
| 1001 RETRANSMISSION | 898 | 2 | NO |
| 1002 COMMUNICATION DISCONNECTION | 460 | 1 | NO |
| 1003 BUSY | 1361 | 3 | NO |
| 1004 COMMUNICATION TIMEOUT | 120 | 50 | YES |
| 1005 NUMBER OF TARGET PACKETS | 45040578 | 10013 | |

FIG. 13

```
------FRAME 1234------
FRAME   STATUS          TRANSMISSION      TRANSMISSION      SIZE  RELATIVE     DELTA      ABSOLUTE              SUMMARY
                        SOURCE            DESTINATION             TIME          TIME       TIME
                        ADDRESS           ADDRESS

1234    RETRANSMISSION  [111.111.0.60]    [111.111.1.38]    1514  0:00:08.172   0.000.051  02/02/2006 10:21:44   TCP: D = 1088  S = 515
ACK = 3627578136  SEQ = 1221715467  LEN = 1460  WIN = 15550
```
↑
1101

```
------FRAME 1358------
FRAME   STATUS          TRANSMISSION      TRANSMISSION      SIZE  RELATIVE     DELTA      ABSOLUTE              SUMMARY
                        SOURCE            DESTINATION             TIME          TIME       TIME
                        ADDRESS           ADDRESS

1358    BUSY            [111.111.0.60]    [111.111.1.38]    1514  0:00:08.172   0.000.051  02/02/2006 10:21:44   TCP: D = 1088  S = 515
RST ACK = 3627578136  SEQ = 1221715467  LEN = 1460  WIN = 15550
[POSSIBLY RELATED TO PDL ERROR (SYNTAX ERROR)]
```
↑
1102

```
------FRAME 1358------
FRAME   STATUS          TRANSMISSION      TRANSMISSION      SIZE  RELATIVE     DELTA      ABSOLUTE              SUMMARY
                        SOURCE            DESTINATION             TIME          TIME       TIME
                        ADDRESS           ADDRESS

1358    TIMEOUT         [111.111.1.60]    [111.111.1.38]    1514  0:00:08.172   0.000.051  02/02/2006 10:21:44   TCP: D = 1088  S = 515
        (ABNORMAL
        EVENT)
ACK = 3627578136  SEQ = 1221715467  LEN = 1460  WIN = 0
[POSSIBLY RELATED TO PDL ERROR (SYNTAX ERROR)]
```
↑
1103

FIG. 14

| CONTENT OF DATA TRANSMISSION APPLICATION ERROR (1210) | POSSIBLE COMMUNICATION FAILURE (1220) |
|---|---|
| NO RESPONSE FROM PARTNER | COMMUNICATION DISCONNECTION<br>COMMUNICATION TIMEOUT |
| TRANSMISSION TIMEOUT | COMMUNICATION DISCONNECTION<br>COMMUNICATION TIMEOUT<br>BUSY |

FIG. 15

```
1301 { Retrans = YES
       Busy    = YES
       Timeout = NO
       Reset   = NO
1302 { Pattern = {0xff, 0xff, 0xff, 0xff, 0xff, 0xff, 0x00, 0x00, 0x85, 0xff,
       0xee, 0xdd, 0x80, 0x00}
```

IMAGE FORMING APPARATUS AND ANALYSIS METHOD

BACKGROUND OF THE INVENTION

1. Field of the Invention

The present invention relates to an image forming apparatus and an analysis method, and more specifically, to a technique for performing analysis of errors that have occurred in apparatuses using packets.

2. Description of the Related Art

Techniques have been developed in which when a fault has occurred in a network communication device, packets delivered over networks (communication lines) are extracted to investigate the cause of the fault. In a typical example of such techniques, a dedicated device used to obtain packets is connected to a line concentrator such as a hub to extract packets delivered over a local area network (LAN). The content of data of packets transmitted and received by a target network communication device to be investigated is determined using analysis of the extracted packets to specify a portion that has received unacceptable data or a portion where a response delay to a received packet has occurred. In order to determine whether or not such a portion is the cause of the fault, an investigation is performed. For example, the same packet is transmitted to the network communication device to check the recurrence of the fault, or a source code that controls communications of the network communication device is analyzed.

In such a process of obtaining packets or performing analysis of packets, in order to reserve a storage area of a packet obtaining device and reduce the load of the analysis of packets, a filtering function of a packet is used. With the use of the filtering function, only packets matching a specific condition can be obtained. Thus, the number of packets to be obtained can be reduced to reduce the capacity of a memory area for storing the obtained packets or a storage area of a hard disk for storing the obtained packets for a long time. In addition, the number of steps required for the analysis can be reduced. Filtering rules are generally specified by elements of network protocols. For example, only a specific protocol, such as Internet Protocol (IP) or Address Resolution Protocol (ARP), is filtered so that only packets according to the protocol can be obtained. In each protocol, more detailed filtering based on elements is also possible. For example, in the IP protocol, detailed filtering can be performed by setting conditions such as a specific transmission destination address (DST address), a specific transmission source address (SRC address), and a specific upper-layer protocol.

Recently, network communication devices having a packet obtaining function have become widely used. Such network communication devices are capable of obtaining packets without using dedicated devices to obtain packets. Thus, it is possible to obtain packets even in an environment where it is difficult to correctly obtain packets if a dedicated device is connected, such as an environment where a switching hub is installed. In addition, recently, filtering techniques specific to the application of network devices as well as the functionality thereof have become available. In such filtering techniques, unlike the filtering technique described above in which filtering is performed in units of network protocol elements, filtering specific to the functions of devices is performed. This enables more efficient fault analysis. Japanese Patent Laid-Open No. 2004-362386 discloses a technique of storing data for every print job received by a network printer. With this technique, in order to analyze a fault that has occurred during printing of print jobs received via a network, only a print job in which the fault has occurred can be extracted, and the efficiency of analysis can be improved.

However, the technique of the related art described above has problems as follows.

A first problem is that due to the filtering, it is difficult to perform comparison with print jobs under normal conditions. As in the technique of the related art described above, as a result of filtering performed for every print job, a fault analyzer can only obtain packets associated with a print job in which a fault has occurred. Therefore, if a communication failure that can cause a fault is found in the obtained packets, it is difficult to determine whether or not the communication failure is the cause of the fault. For example, in a case where an event that can cause a fault, such as retransmission of a packet or transmission retry, has occurred in an obtained print job, if this event also occurs in a print job that can correctly be printed, the probability that the event causes the fault may be low. In the technique of the related art, however, it is necessary to investigate all communication failures detected in packets, and a large load is imposed on the analyzer.

Another problem is that although the number of packets can be relatively reduced by performing filtering, if the absolutely number of packets (amount of data) is large, a long time is required for the analysis. With the recent increase in the complexity and functionality of network applications, the size of data delivered over networks has also increased. In the technique of the related art, filtering is performed for every print job received by a network printer. Since recent network printers may receive a print job larger than 1 gigabyte in data size, a large amount of time is required for an analyzer to analyze packet data of 1 gigabyte.

SUMMARY OF THE INVENTION

The present invention provides the capability of sufficiently obtaining packets necessary for analysis of a communication failure from among all packets obtained.

In an embodiment of the present invention, an image forming apparatus includes an obtaining unit configured to obtain packets by executing an application used to process a job; a determining unit configured to determine whether or not the packets obtained by the obtaining unit include a failed packet; a storage unit configured to store, when the determining unit determines that the obtained packets include a failed packet, the failed packet in a memory; a comparing unit configured to compare, when an error has occurred during the execution of the application used to process a job, a tendency of occurrence of packets obtained by executing the application with a tendency of occurrence of packets that are determined to be failed packets and that are stored by the storage unit when the execution of the application has been normally completed; and a detecting unit configured to detect, from among the packets obtained by executing the application, types of packets having a different tendency of occurrence from the tendency of occurrence of the packets that are determined to be failed packets on the basis of the comparison performed by the comparing unit and that are stored by the storage unit when the execution of the application has been normally completed.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a block diagram showing an example structure of a main part of a controller unit of a multi function peripheral (MFP) according to the first embodiment of the present invention.

FIG. 3 is a block diagram showing an example structure of main functions of the MFP according to the first embodiment of the present invention.

FIG. 4 is a block diagram showing in detail an example structure of an application according to the first embodiment of the present invention.

FIG. 7 is a diagram showing an example of a visual representation of a datagram of a received packet according to the first embodiment of the present invention.

FIG. 9 is a diagram showing a visual representation of an example of data sets of a file generated in step S505 shown in FIG. 5 according to the first embodiment of the present invention.

FIG. 11 is a table showing an example of the correspondence between errors caused when PDL data received through an LPD unit is processed by a PDL unit and failures on network communication that can cause the errors according to the first embodiment of the present invention.

FIG. 12 is a diagram showing a table showing an example of the correspondence, for every communication failure, among the number of packets in communication failure logs, the number of error job packets, and the presence of abnormal failure occurrence tendency according to the first embodiment of the present invention.

FIG. 13 is a diagram showing an example of an application communication failure log according to the first embodiment of the present invention.

FIG. 14 is a diagram showing an example of errors that can occur in a data transmission application according to a second embodiment of the present invention.

FIG. 15 is a diagram showing an example of a configuration file according to a fourth embodiment of the present invention.

DESCRIPTION OF THE EMBODIMENTS

First Embodiment

A first embodiment of the present invention will be described hereinafter with reference to the drawings.

Figure 1:
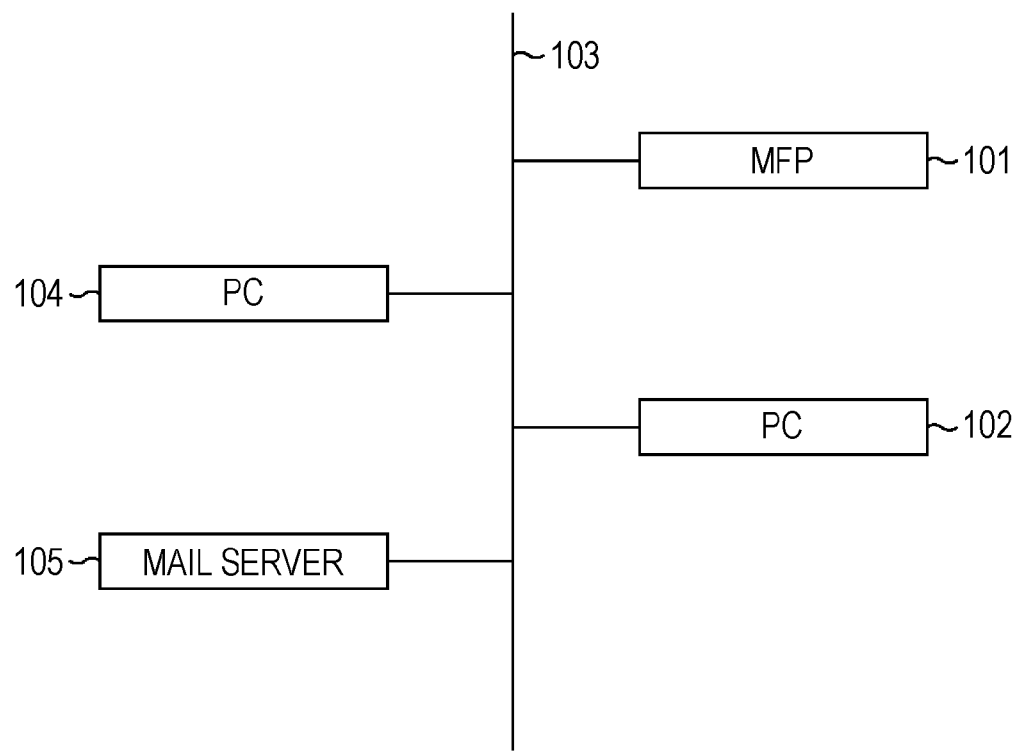
FIG. 1 is a block diagram showing an example structure of a network system according to a first embodiment of the present invention.

FIG. 1 is a block diagram showing an example structure of a network system.

A LAN 103 is a user environment network and may be, for example, an Ethernet (registered trademark in Japan) network. Nodes each having a plurality of network interfaces, which will be described below, are connected to the LAN 103.

A multi function peripheral (MFP) 101 is a multifunction device. The hardware of the MFP 101 will be described below in detail with reference to FIG. 2.

Personal computers (PCs) 102 and 104 are general-purpose PCs. The hardware of each of the PCs 102 and 104 mainly includes a central processing unit (CPU) serving as a central operation device; a storage device including a random access memory (RAM), a read only memory (ROM), and a hard disk drive (HDD); an external storage device including a compact disc read only memory (CD-ROM) drive; and an external interface including a network interface card (NIC) and a universal serial bus (USB) host interface. The hardware further includes a bus serving as a communication path through which those devices, the MFP 101, etc., are controlled. Peripheral devices connected to the main body of the PCs 102 and 104 include a mouse, a cathode ray tube (CRT) display, and a keyboard.

Main software installed in the PCs 102 and 104 includes operating system (software) (OS) and office software including word processor and spreadsheet. The OS includes, as a function, a port monitor configured to transmit print data to a printer (not shown) or the MFP 101 via a network such as the LAN 103. The OS further includes a mailer configured to perform electronic mail transmission and reception to transmit or receive electronic mail to or from a mail server 105 described below.

The mail server 105 is an electronic mail server, and is a server that controls transmission and reception of electronic mail using the Simple Mail Transfer Protocol (SMTP) or the Post Office Protocol (POP3). The mail server 105 is configured such that electronic mail accounts of the MFP 101 and the PCs 102 and 104 are set up in the mail server 105 and a setting is made so that the individual nodes (the MFP 101 and the PCs 102 and 104) can transmit electronic mail via the mail server 105.

FIG. 2 is a block diagram showing an example structure of a main part of a controller unit 2000 of the MFP 101. The controller unit 2000 is connected to a scanner 2070 serving as an image input device or a printer 2095 serving as an image output device. The controller unit 2000 performs control for implementing a copying function for printing and outputting image data read by the canner 2070 using the printer 2095. The controller unit 2000 further performs control for inputting and outputting image information or device information when it is connected to the LAN 103. Specifically, the controller unit 2000 includes a CPU 2001, and the CPU 2001 starts OS according to a boot program stored in a ROM 2003. By executing an application program stored in an HDD 2004 on the OS, various processes are executed. A RAM 2002 is used as a work area of the CPU 2001. The RAM 2002 provides, as well as a work area, an image memory area for temporarily storing image data. The HDD 2004 stores the application program, image data, etc.

The CPU 2001 is connected to an operation unit interface (I/F) 2006, a network I/F 2010, a modem 2050, and an image bus I/F 2005 via a system bus 2007. The operation unit I/F 2006 interfaces with an operation unit 2012 having a touch panel, and outputs image data to the operation unit 2012 for display on the operation unit 2012. The operation unit I/F 2006 further forwards information input from a user using the operation unit 2012 to the CPU 2001. The network I/F 2010 is connected to the LAN 103, and inputs and outputs information to and from apparatuses connected to the LAN 103 via the LAN 103. The modem 2050 is connected to a public line such as a wide area network (WAN) 1007, and inputs and outputs information. The image bus I/F 2005 is a bus bridge adapted to connect the system bus 2007 and an image bus 2008 for high-speed transfer of image data to each other and adapted to exchange a data structure. The image bus 2008 may be a peripheral component interface (PCI) bus or an IEEE (the Institute of Electrical and Electronics Engineers) 1394 bus. The image bus 2008 is connected to a raster image processor (RIP) 2060 and a device I/F 2020. The image bus 2008 is also connected to a scanner image processing unit 2080, a printer image processing unit 2090, an image rotation unit 2030, and an image compression unit 2040. The RIP 2060 is a processor configured to expand a page description language (PDL) code into a bitmap image. The scanner 2070 and the printer 2095 are connected to the device I/F 2020, and the device I/F 2020 serves to perform synchronous-asynchronous conversion of image data. The scanner image processing unit 2080 is configured to correct, modify, and edit input image data. The printer processing unit 2090 performs processing such as correction and resolution conversion on image data to be output as a print. The image rotation unit 2030 performs rotation of image data. The image compression unit 2040 compresses multi-valued image data into JPEG (Joint Photographic Experts Group) data and binary image data into data such as JBIG (Joint Bi-level Image experts Group), MMR (Modified Modified Read), or MH (Modified Huffman) data, and also expands compressed image data.

FIG. 3 is a block diagram showing an example structure of main functions of the MFP 101. In the structure shown in FIG. 3, the network I/F 2010 is implemented by hardware (see FIG. 2), and remaining components are implemented by software.

The MFP 101 includes a general-purpose OS such as Linux®. An application (application program) 301 is a set of network applications operating on the MFP 101. Network applications included in the application 301 are described in detail below with reference to FIG. 4.

A socket I/F 302 is a socket I/F program provided by the OS. The socket I/F 302 is invoked when a network application included in the application 301 performs communication, thereby enabling processes such as transmission and reception of data. The socket I/F 302 is not necessarily necessary for a network application to perform communication. However, because of the capability of using general-purpose program instructions and processing flow regardless of OS type, the socket I/F 302 can reduce the number of development steps of the application 301. In the present embodiment, therefore, a network application invokes the socket I/F 302 to perform transmission and reception of data.

A network stack 303 is a group of protocol stacks. A network device driver 304 is a device driver of the network I/F 2010. A packet obtaining application 305 is an application configured to obtain a network packet to be transmitted or received using the network I/F 2010 or to output a log. The packet obtaining application 305 obtains data from the network device driver 304 to thereby obtain all packets received using the network I/F 2010 and all packets to be transmitted using the network I/F 2010. The application 301 and the packet obtaining application 305 operate in the application space, and the socket I/F 302, the network stack 303, and the network device driver 304 operate in the kernel space.

FIG. 4 is a block diagram showing in detail an example structure of the application 301.

A Line Printer Daemon (LPD) unit 401 is a server program adapted to receive a print job via a network such as the LAN 103 using the Line Printer Remote (LPR) protocol. For example, when the PC 102 transmits a print job to the MFP 101 using the LPR protocol, the LPD unit 401 receives data of the print job. The print job data received by the LPD unit 401 is transferred to a PDL unit 402. The PDL unit 402 is a program adapted to expand a print job. Print job data is written in a description language called PDL. In this language, in addition to print data, information necessary for printing is added. Examples of the information include the paper size and the number of prints. The PDL unit 402 expands print job data written in PDL, converts print data into a video image, and creates video data according to specified printing attributes. The created video data is transferred to the printer 2095 and a printing process is then performed.

A data transmission application 404 has a function for transmitting image data scanned by the scanner 2070 to the mail server 105 through a network such as the LAN 103. The image data scanned by the scanner 2070 is converted into a file using an image format such as the JPEG or Portable Document Format (PDF). The data transmission application 404 transfers the resulting file of the image data to the mail server 105 through a Simple Mail Transfer Protocol (SMTP) unit 403. The SMTP unit 403 is a network application adapted to transmit electronic mail to the mail server 105 using the SMTP protocol. In the present embodiment, a setting for transmitting electronic mail to the mail server 105 is made in advance.

Figure 5:
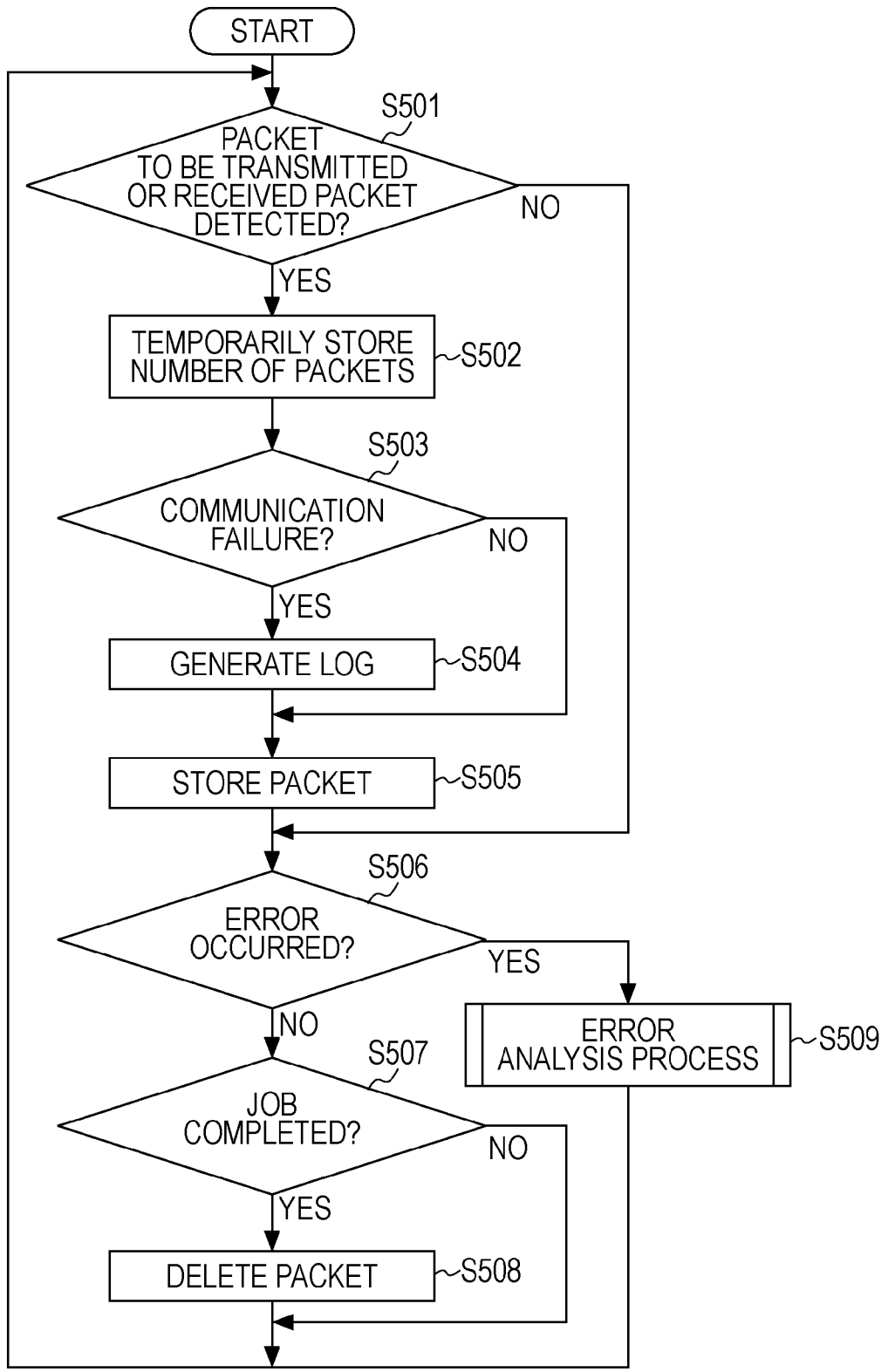
FIG. 5 is a flowchart showing an example of the operation involved in obtaining a packet under normal conditions according to the first embodiment of the present invention.

FIG. 5 is a flowchart showing an example of the operation involved in obtaining a packet under normal conditions. The process shown in FIG. 5 is always performed when the packet obtaining function is set active in the MFP 101.

In step S501, the packet obtaining application 305 monitors the network I/F 2010 to determine the presence of a packet to be transmitted or a received packet. If no packet to be transmitted or received packet is found at the network I/F 2010, the process proceeds to step S506, described below, while skipping steps S502 to S505. If a packet to be transmitted or a received packet is detected at the network I/F 2010, the process proceeds to step S502.

In step S502, the packet obtaining application 305 temporarily stores in the program the number of packets to be transmitted or received packets.

Then, in step S503, the packet obtaining application 305 determines whether or not the packets to be transmitted or received packets include a failed packet (whether or not a communication failure has occurred). If it is determined that no failed packet is included, the process proceeds to step S505, described below, while skipping step S504. If a failed packet is included, the process proceeds to step S503. In step S503, the packet obtaining application 305 organizes information concerning the failed packet into a log.

Figure 6:
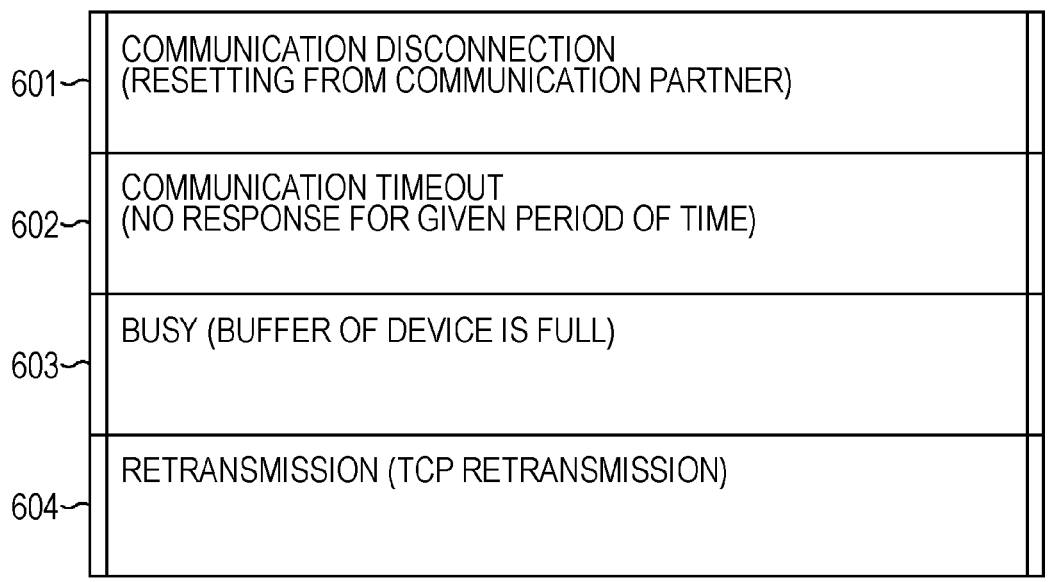
FIG. 6 is a diagram showing an example of communication behaviors to be determined in step S503 shown in FIG. 5 to cause failures according to the first embodiment of the present invention.

FIG. 6 is a diagram showing an example of communication behaviors to be determined in step S503 to cause failures.

In FIG. 6, examples of communication behaviors to be determined to cause failures include a communication disconnection 601, a communication timeout 602, a busy state 603, and a retransmission 604.

First, the communication disconnection 601 will be described. For example, in the Transmission Control Protocol/Internet Protocol (TCP/IP), a given device delivers a reset (RST) packet to a partner device when communication is to be disconnected. An RST packet is used under normal TCP/IP communication conditions, and may also be transmitted when a failure has occurred in an application. Therefore, when a packet to be transmitted or received packet is an RST packet, it is determined that a communication failure (a failure in communication) has occurred.

The communication timeout 602 will now be described. For example, in connection-oriented protocols such as TCP/IP, if no response to a packet is found for a certain period of time or more, a failure may have occurred. Therefore, when no response to a packet is found for a certain period of time or more, it is determined that a communication failure has occurred.

The busy state 603 will now be described. For example, in TCP/IP, a given device notifies a communication destination device of the window size indicating the available space of a receiving buffer of the given device. If the reading of data from the receiving buffer is not available due to the occurrence of a failure in an application, the receiving buffer becomes full, and data is no longer received. Such an unreceivable state is referred to as a "busy state". A busy state generally occurs when the processing speed of the application is low, and may also occur when a failure has occurred in the application. Therefore, when a busy state has occurred, it is determined that a communication failure has occurred.

The retransmission 604 will now be described. For example, in TCP/IP, when there is no acknowledgement to transmitted data for a certain period of time, packets are retransmitted. The retransmission of a packet may also occur when a failure has occurred in an application. Therefore, in a case where a packet was retransmitted, it is determined that a communication failure has occurred.

Figure 7:
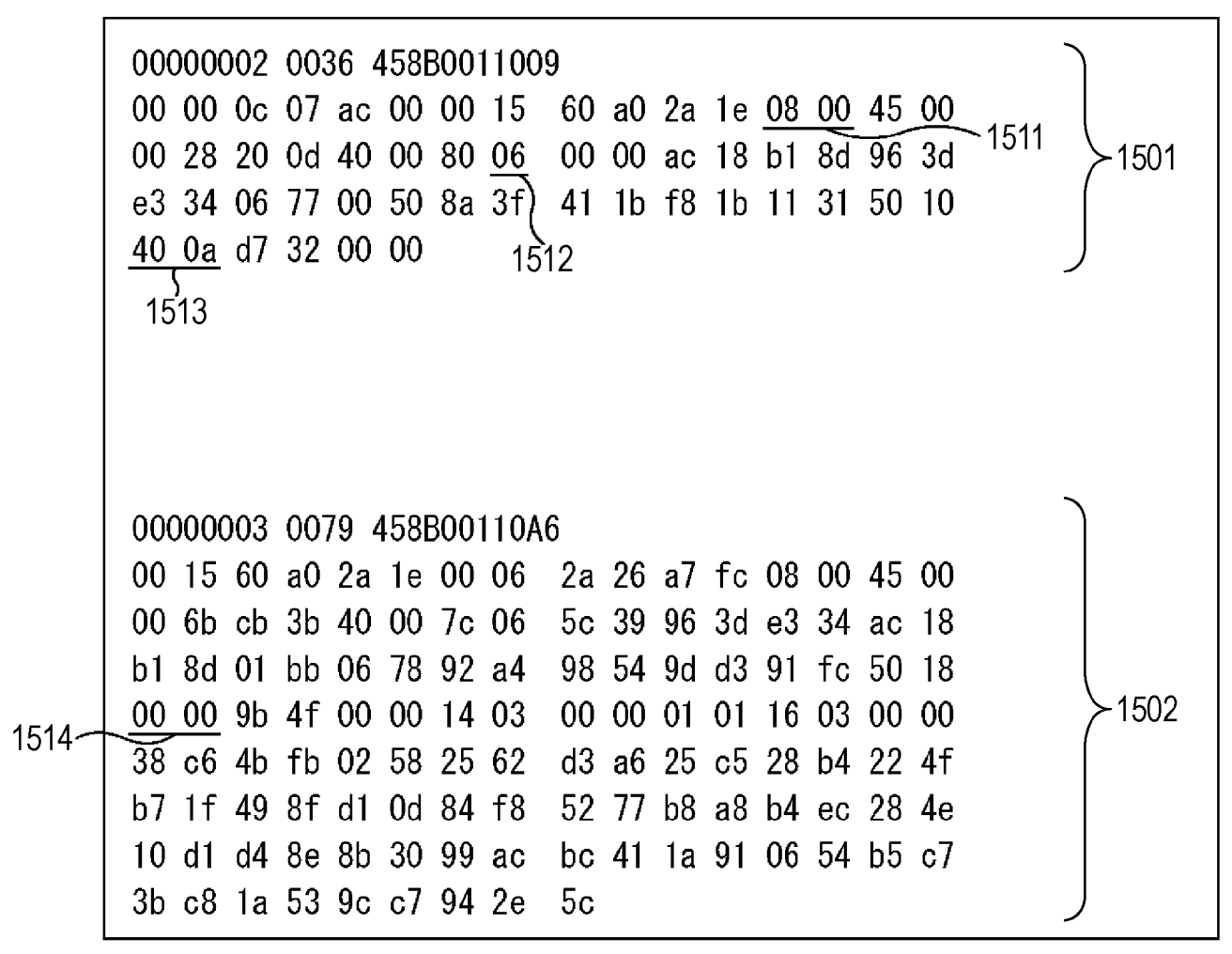

Next, an example of a mechanism for checking a received packet for the presence of a communication failure will be described with reference to FIG. 7. FIG. 7 is a diagram showing an example of a visual representation of a datagram of a received packet.

In FIG. 7, data sets 1501 and 1502 are datagrams of received packets. A processing sequence for examining the presence of the busy state 603 will be described by way of example. The packet obtaining application 305 checks each of received packets for the TCP/IP window size value thereof. Then, the packet obtaining application 305 refers to next protocol information 1511 included in the Ethernet header of the packet datagram of the data set 1501. When the next protocol information 1511 has a value of 0x0800, which indicates IP, the packet obtaining application 305 refers to next header information (protocol) 1512 in the IP header.

When the next header information 1512 in the IP header has a value of 0x06, which indicates TCP, the packet obtaining application 305 refers to the TCP window size. Since a TCP window size 1513 has a value of 0x400a, the data set 1501 indicating a packet data set has a window size of 0x400a bytes. Therefore, the packet obtaining application 305 determines that a busy state has not occurred (or determines that no communication failure has occurred).

Then, the packet obtaining application 305 examines the data set 1502, which presents a next packet. The packet obtaining application 305 refers to the window size in a manner similar to that in the case of the data set 1501. In the data set 1502, a window size 1514 has a value of 0x0000. In this case, the packet obtaining application 305 determines that a busy state has occurred.

Referring back to FIG. 5, as described above, if it is determined in step S503 that the packets to be transmitted or received packets include a failed packet, the process proceeds to step S504, and the packet obtaining application 305 generates a log concerning the failed packet. The log is generated in the HDD 2004. Information stored as a log includes acquisition date and time, protocol information, and the type of communication failure. The protocol information includes information capable of identifying a network application. In the following description, the log is referred to as a "communication failure log" if necessary.

Figure 8:
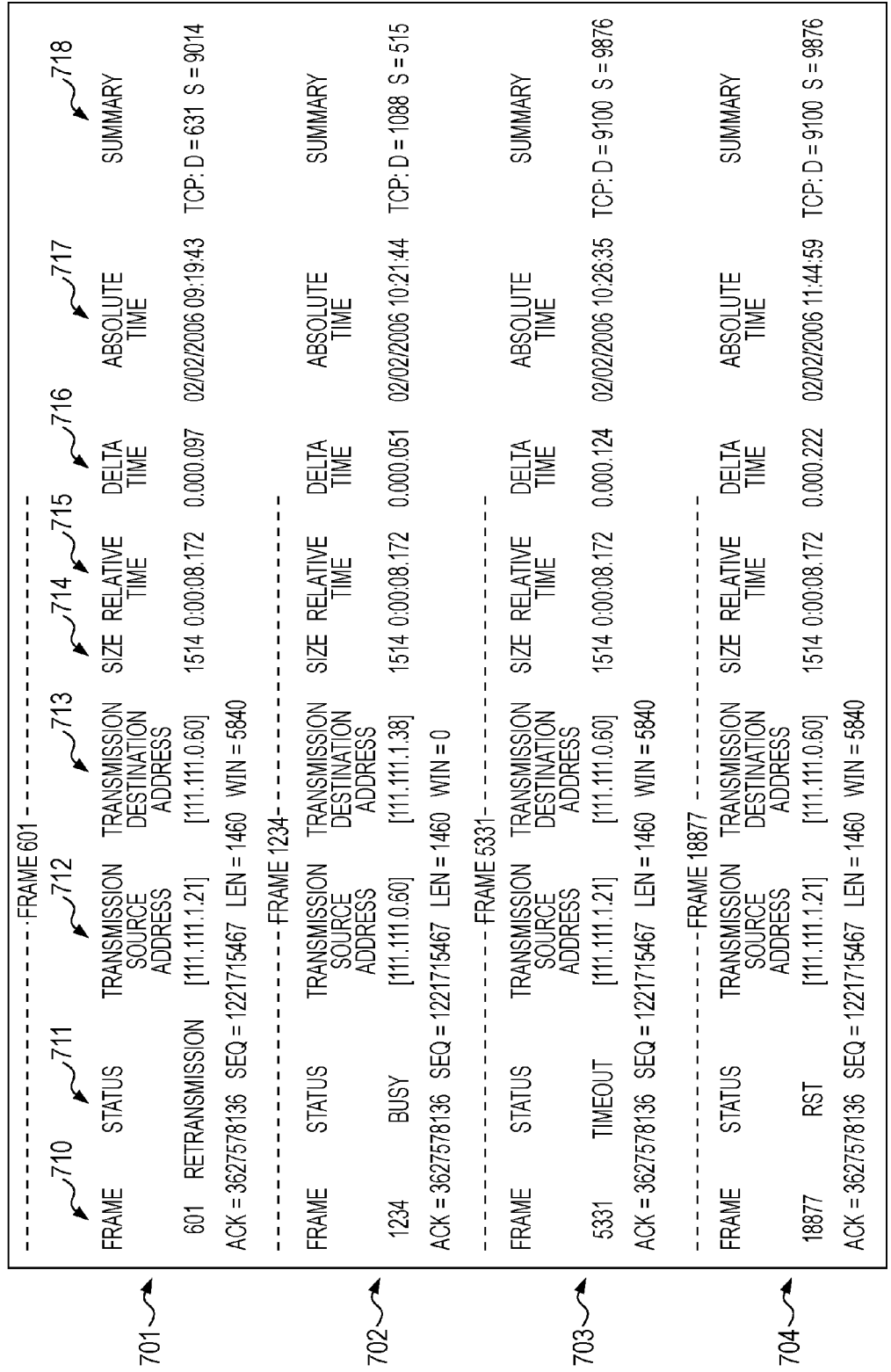
FIG. 8 is a diagram showing an example of a communication failure log according to the first embodiment of the present invention.

FIG. 8 is a diagram showing an example of a communication failure log.

In the example shown in FIG. 8, logs 701 to 704 indicating communication failures in four packets are generated. Information concerning each of the individual packets includes a frame identifier (ID) 710, a status 711, a transmission source address 712, a transmission destination address 713, a size 714, a relative time 715, a delta time 716, an absolute time 717, and a protocol summary 718.

The frame ID 710 is an ID for uniquely identifying a packet to be transmitted or a received packet, and each packet is assigned a unique ID. The type of communication failure is defined in the status 711. In the IP protocol, an IP address of a transmission source is defined in the transmission source address 712 and an IP address of a transmission destination is defined in the transmission destination address 713. The size of the packet is defined in the size 714. The size of a packet is expressed in bytes. The relative time 715 describes an elapsed time since the obtaining of packets was started. A period of time that has elapsed since the transmitting or receiving time of the previous packet is defined in the delta time 716.

The date and time when the packet was obtained are defined in the absolute time 717. Information of the transport layer is mainly defined in the protocol summary 718. For example, in TCP, a transmission destination port, a transmission source port, optional bit information, a sequence number, a data length, and a window size are defined in the protocol summary 718. A user can refer to the port number to identify a network application.

Referring back to FIG. 5, in step S505, the packet obtaining application 305 stores the obtained packets in, for example, the HDD 2004. The packet obtaining application 305 writes all received packet data in the HDD 2004 as a file using a predetermined format. A file is generated for every job. That is, a collection of packets corresponding to data of one of print jobs received by the LPD unit 401 is stored in the HDD 2004 as one file.

Figure 9:
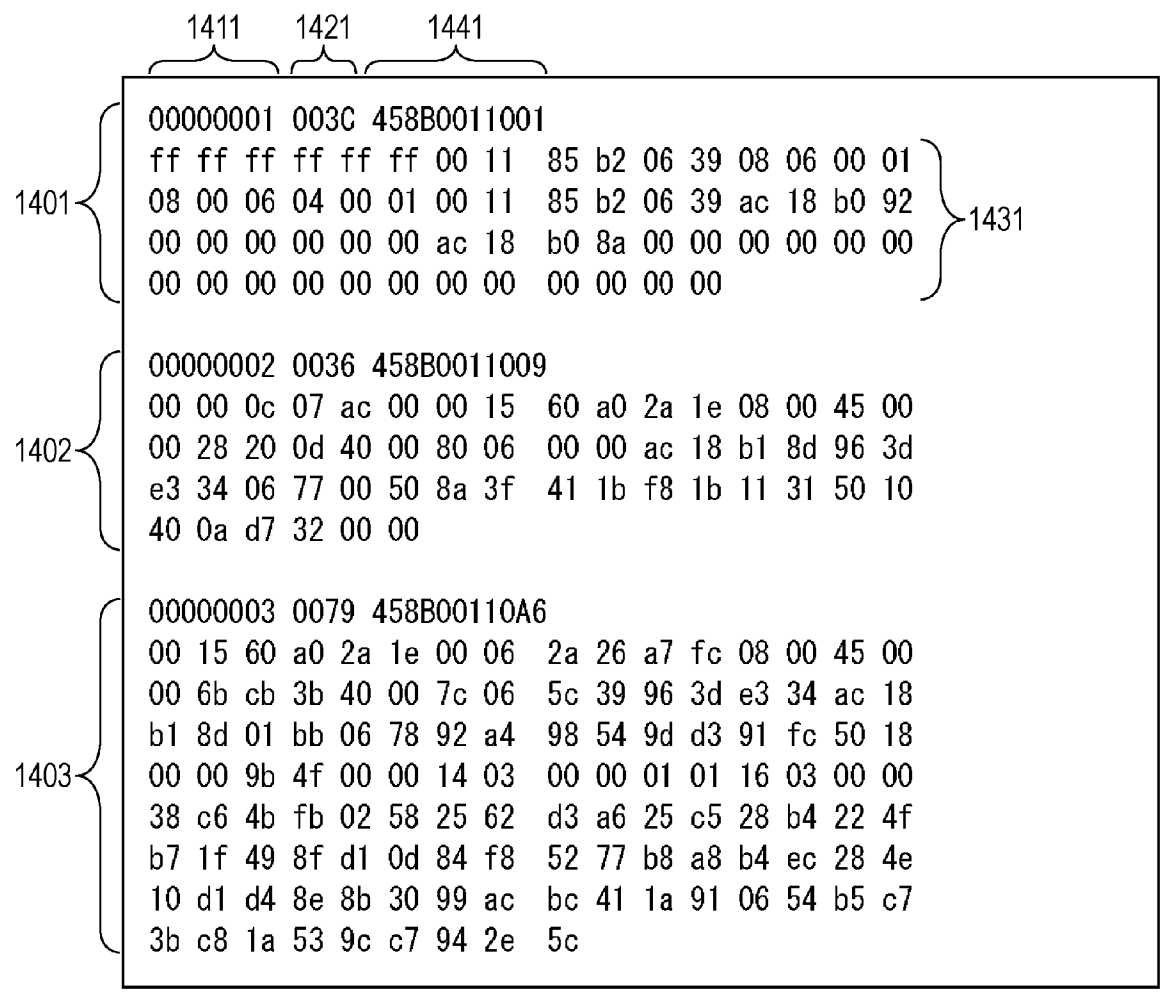

FIG. 9 is a diagram showing a visual representation of an example of data sets of the file generated in step S505.

Data of packets obtained by the packet obtaining application 305 is written in a file in the order obtained (received). The data of each of the packets contained in the file includes a frame ID, a data length, a packet datagram, and a receiving time. In FIG. 9, each of data sets 1401 to 1403 represents a packet data set. The data set 1401 includes data 1411 indicating a frame ID, data 1421 indicating a data length, a packet datagram 1431, and a receiving time 1441 indicating the receiving time of the packet. The frame ID is an ID for uniquely identifying a packet contained in a file. The data length represents a size of the datagram of one packet, and is expressed in octets. The packet datagram represents data of a packet. The receiving time represents a period of time that has elapsed since 1970, and is expressed in 1/100 seconds.

Referring back to FIG. 5, in step S506, the application 301 determines whether or not an error has occurred. Specifically, the PDL unit 402 or the data transmission application 404 checks the presence of occurrence of a processing error. If it is determined in step S506 that an error has occurred in the application 301, the process proceeds to step S509, and an error analysis process is performed. The error analysis process will be described in detail with reference to a flowchart of FIG. 10. If no error has occurred in the application 301, the process proceeds to step S507.

In step S507, the packet obtaining application 305 determines whether or not the processing of the print job by using the application 301 has completed. Specifically, for example, it is determined whether or not the print job processed by the PDL unit 402 or the data transmission application 404 has completed without causing an error. If it is determined in step S507 that the processing of the print job by using the application 301 has not completed, the process returns to step S501 while skipping step S508.

If it is determined in step S507 that the processing of a print job by using the application 301 has completed, the process proceeds to step S508. In step S508, the packet obtaining application 305 deletes the file of the associated packets. Then, the process returns to step S501.

Specifically, the packet obtaining application 305 deletes the file of the data of the packets temporarily stored for every job in step S505. The data to be deleted here is a file of packets associated with the print job that is determined in step S506 to have no error. That is, in a case where packets are transmitted and received without difficulty via a network and in a case where there is no problem with the operation of the application 301, the associated packets are deleted.

Accordingly, according to the flow of the series of steps S501 to S509, a log concerning a packet in which a communication failure has occurred from among packets to be transmitted and received via the network I/F 2010 is stored in the HDD 2004 as a communication failure log. While received packets are converted into a file for every job and are stored in the HDD 2004, packets associated with a normal print job in which no error has occurred in the application 301 are deleted when it is determined that the print job has been completed without causing an error.

Figure 10:
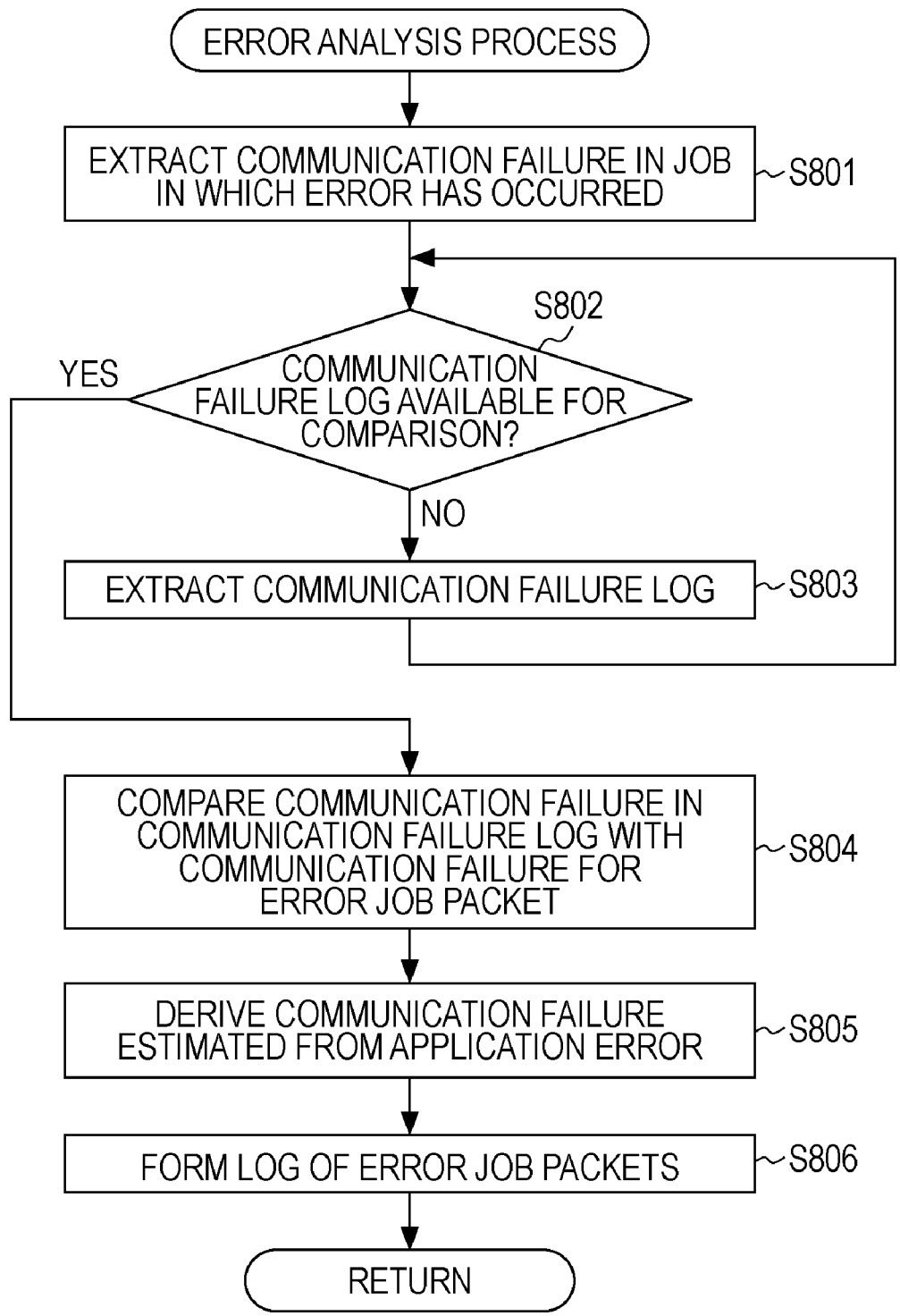
FIG. 10 is a flowchart showing in detail an error analysis process in step S509 shown in FIG. 5 according to the first embodiment of the present invention.

The error analysis process in step S509 shown in FIG. 5 will now be described in detail with reference to a flowchart shown in FIG. 10. FIG. 10 shows a process performed in a case where an error has occurred in the PDL unit 402, as an example of an application.

First, a specific example of an error that has occurred in the PDL unit 402 will be described. FIG. 11 is a table showing an example of the correspondence between errors (PDL errors) caused when PDL data received through the LPD unit 401 is processed by the PDL unit 402 and failures on network communication that can cause the errors.

The MFP 101 internally stores in advance information corresponding to the table shown in FIG. 11, and uses it for a process described below.

In FIG. 11, a SYNTAX error 901 is an error caused when PDL data includes a grammatically incorrect portion. For example, it is assumed that the following statement of PDL data is grammatically correct:

[50 100 moveto]

When the PDL unit 402 receives data including an incorrect statement such as that below, a SYNTAX error occurs:

[50 100 movet]

In FIG. 11, a communication failure 911 on a network that can cause a SYNTAX error includes a busy state and a communication timeout. If a busy state or a communication timeout occurs on a network, no transfer of data to a higher-layer application, such as the PDL unit 402, for a certain period of time occurs. In this case, processing continues within the PDL unit 402, and PDL data may be incompletely processed. A SYNTAX error is a grammatical error and can also occur when data is incomplete.

A decoding error 902 refers to an error caused by incorrect decoding into image data due to an error other than a grammatical error when a process of deriving image data from an image format included in PDL data. For example, it is assumed that the following statement of PDL data is grammatically correct:

[50 100 moveto]

If a value of 1025 or more is specified although a parameter specifying the numerical value 50 in the above statement has an upper limit of 1024, a decoding process is not successfully completed and a decoding error is output. There is no communication failure on a network that causes a decoding error, and a result indicating no communication failure is stored in the MFP 101.

A garbled character 903 occurs, for example, when a character code that is not included in a specified character code set is specified. There is no communication failure on a network that causes this phenomenon, and a result indicating no communication failure is stored in the MFP 101.

A job timeout 904 occurs, for example, when a process is stopped or interrupted due to a timeout. Some PDL units may stop or interrupt processing due to a timeout when there is a certain blank period (of time) for which no PDL data is received after the reception of PDL data is started. In this case, the presence of a blank period having a predetermined duration during data communication (transmission or reception) may be measured as a possible event on a network that can cause the stopping or interruption of processing. The presence of such a blank period may also cause a blank period during reception (or transmission) by the PDL unit 402, which can cause a job timeout.

It is assumed that the error detected in step S506 shown in FIG. 5 is one of the errors shown in FIG. 11.

Referring to FIG. 10, in step S801, the packet obtaining application 305 performs a process of extracting a communication failure in a print job in which an error has occurred from data of packets by which the PDL unit 402 transmits and receives PDL data in which the error has occurred. Specifically, the packet obtaining application 305 opens a file of a packet in which an error has occurred, which is stored in the HDD 2004, and extracts a communication failure. Packets by which PDL data in which an error has occurred is transmitted and received are hereinafter referred to as "error job packets" if necessary.

Then, in step S802, the packet obtaining application 305 checks the number of packets in communication failure logs to be compared with communication failures in error job packets, and determines whether or not the communication failure logs are available for comparison. If the number of packets in communication failure logs to be compared with communication failures in error job packets is small, the reliability with which the cause of error is determined from a result of the comparison between the communication failures in the communication failure logs and the communication failures in the error job packets is low. Thus, communication failure logs are continuously extracted until sufficient reliability for comparison is achieved. In the present embodiment, it is assumed that sufficient reliability for comparison is achieved when the number of packets in communication failure logs to be compared with communication failures in error job packets is more than a threshold value with respect to the number of error job packets (for example, more than ten times the number of error job packets). If the number of packets in communication failure logs to be compared with communication failures in error job packets is not more than the threshold value with respect to the number of error job packets (for example, not more than ten times the number of error job packets), communication failure logs are continuously extracted.

If it is determined in step S802 that communication failure logs are available for comparison, the process proceeds to step S804 while skipping step S803. If communication failure logs are not available for comparison, the process proceeds to step S803.

The processing of step S802 will be more specifically described. First, the packet obtaining application 305 obtains the total packet number from the file of the error job packets.

Then, the packet obtaining application 305 compares the obtained total packet number with the total number of packets internally stored in step S502 shown in FIG. 5. If the total number of packets internally stored in step S502 shown in FIG. 5 is more than ten times the total packet number of the error job packets as a result of the comparison, the process proceeds to step S804 while skipping step S803.

If the total number of packets internally stored in step S502 shown in FIG. 5 is not more than ten times the total packet number of the error job packets, the process proceeds to step S803. In step S803, the packet obtaining application 305 continues to obtain packets. Specifically, in step S803, the packet obtaining application 305 repeatedly performs the steps of extracting a communication failure log in a manner similar to that described above with reference to FIG. 5. Then, when the total number of internally stored packets becomes more than ten times the total packet number of the error job packets, the process proceeds to step S804.

In step S804, the packet obtaining application 305 performs a process of comparing the communication failures in the communication failure logs with the communication failures in the file of the error job packets. Specifically, the packet obtaining application 305 determines the number of occurrences of communication failures in the communication failure logs and the number of occurrences of communication failures in the file of the error job packets, and extracts a location exhibiting an abnormal occurrence tendency compared with a statistical failure occurrence tendency. In a case where the number of occurrences of communication failures in the communication failure logs is to be determined, only logs that are communicated using the same application as an application in which an error has occurred are extracted to determine the number of occurrences of communication failures in the logs.

For example, it is assumed that an application in which an error has occurred is the PDL unit 402. In this case, an application operating as a network server in a layer lower than that of the PDL unit 402 is the LPD unit 401. Thus, the packet obtaining application 305 extracts only packets used in communication performed by the LPD unit 401 from communication failure logs. More specifically, since the LPD unit 401 has a port number of 515, the packet obtaining application 305 extracts packets having an SRC port of 515 and a DST port of 515. In addition, the packet obtaining application 305 also extracts packets associated with the extracted packets. The associated packets may be, for example, address resolution protocol (ARP) packets.

Then, the packet obtaining application 305 determines the number of occurrences of communication failures in the extracted packets to extract a statistical failure occurrence tendency. FIG. 12 is a table showing an example of the correspondence, for every communication failure, among the number of packets in communication failure logs, the number of error job packets, and the presence of abnormal failure occurrence tendency.

In FIG. 12, types of communication failures (failed packets) include a retransmission 1001, a communication disconnection 1002, a busy state 1003, and a communication timeout 1004.

The number of packets in which each error (the retransmission 1001, the communication disconnection 1002, the busy state 1003, or the communication timeout 1004) has occurred among packets in communication failure logs is shown in a "communication failure log" field 1010. The number of packets in which each error has occurred among error job packets is shown in an "error job packet" field 1020.

The total number of target packets (the number of packets in the communication failure logs plus the number of error job packets) is shown in a "number of target packets" field 1005.

The presence of an abnormal occurrence tendency compared with a failure occurrence tendency is shown in an "abnormal failure occurrence tendency" field 1030.

The "communication failure log" field 1010 shows a value of 898 for the retransmission 1001, indicating that retransmission has occurred 898 times in the communication failure logs, while the "error job packet" field 1020 shows a value of 2 for the retransmission 1001, indicating that retransmission has occurred twice for the error job packets. The ratio of the number of target packets (the "number of target packets" field 1005) shown in the "communication failure log" field 1010 to the number of target packets (the "number of target packets" field 1005) shown in the "error job packet" field 1020 is substantially 4500:1. Comparing the ratio of substantially 4500:1 with the ratio for the retransmission 1001, it is found that there is a substantially completely proportional correlation between the number of occurrences of retransmission shown in the "communication failure log" field 1010 and the number of occurrences of retransmission shown in the "error job packet" field 1020. There is also a correlation for the communication disconnection 1002 and the busy state 1003 between the "communication failure log" field 1010 and the "error job packet" field 1020. That is, there is a correlation between the number of occurrences of communication disconnection in the communication failure logs and the number of occurrences of communication disconnection in the error job packets, and there is a correlation between the number of occurrences of busy state in the communication failure logs and the number of occurrences of busy state for the error job packets. It can therefore be determined that the communication disconnection 1002 and the busy state 1003 do not exhibit an abnormal failure occurrence tendency from the data. As can be seen from the communication timeout 1004 in association with the "communication failure log" field 1010 and the "error job packet" field 1020, however, the number of occurrence of communication timeout for the error job packets is relatively greater than the number of occurrence of communication timeout in the communication failure logs. It can therefore be determined that the communication timeout 1004 exhibits an abnormal occurrence tendency. Accordingly, if it is determined that there is an abnormal failure occurrence tendency as a result of comparison between the "communication failure log" field 1010 and the "error job packet" field 1020, an abnormal event may be related to the occurrence of an application error.

In the foregoing description, the ratio of the number of failed packets to the number of target packets is used for comparison. However, the technique of determining an abnormal failure occurrence tendency according to the present invention is not limited thereto. For example, different types of failed packets may be compared to determine an abnormal failure occurrence tendency. Specifically, the ratio of the number of occurrences of retransmission, the number of occurrences of communication disconnection, and the number of occurrences of communication timeout shown in the "communication failure log" field 1010 is substantially 8:4:1. On the other hand, the ratio of the number of occurrences of retransmission, the number of occurrences of communication disconnection, and the number of occurrences of communication timeout shown in the "error job packet" field 1020 is substantially 2:1:50. In this case, it can be determined that the number of occurrences of communication timeout exhibits a relatively abnormal occurrence tendency. Accordingly, depending on errors, several failed packets may be extracted to determine an abnormal failure occurrence tendency.

Referring back to FIG. 10, in step S805, the packet obtaining application 305 derives a communication failure that can be estimated from the application error that has occurred. Examples of a communication failure corresponding to a PDL error may include, for example, the errors shown in FIG. 11 described above. The packet obtaining application 305 extracts a communication failure from the internally stored information shown in FIG. 11. For example, if the PDL error that has occurred is a SYNTAX error, in FIG. 11, the types of the communication failures (failed packets) that can be estimated to be the cause of the PDL error include a busy state and a communication timeout.

In the present embodiment, therefore, the packet obtaining application 305 performs the following process. One of the packet types 1001 to 1004 that exhibits a failure occurrence tendency different from the occurrence tendency of failed packets shown in the "communication failure log" field 1010 is detected, using information shown in FIG. 12, from the packets obtained by the execution of the application 310.

Then, in step S806, the packet obtaining application 305 organizes communication failures in the error job packets into a log. Specifically, the packet obtaining application 305 extracts the presence of occurrence of the communication failures shown in FIG. 6 for all the error job packets, and organizes the extracted results into an application communication failure log. The information stored as a log includes, for example, as in the processing of step S504, acquisition date and time, protocol information, and the type of communication failure. The protocol information includes information capable of identifying a network application. The packet obtaining application 305 further writes the communication failure exhibiting an abnormal occurrence tendency, which is extracted (estimated) in step S804, and the communication failure estimated to be the cause of the PDL error, which is extracted in step S805, in the application communication failure log so that those communication failures can be individually identified. FIG. 13 is a diagram showing an example of an application communication failure log.

In FIG. 13, a frame 1101 includes a retransmission, which is a communication failure, and thus a log is created. A frame 1102 was in a busy state and thus a log is created. Since a busy state is extracted in step S805 as possibly being the cause of a PDL error (SYNTAX error), the following message is included in the log:

[possibly related to PDL error (SYNTAX error)]

A frame 1103 includes a timeout and thus a log is created. Since a timeout is extracted in step S805 as possibly being the cause of a PDL error (SYNTAX error), the following message is included in the log:

[possibly related to PDL error (SYNTAX error)]

A timeout is also an event that is determined in step S804 to exhibit an abnormal failure occurrence tendency. Therefore, the packet obtaining application 305 describes an additional message "(abnormal event)" in the status to notify an analyzer of the log of an abnormal event. That is, the timeout of the frame 1103 can facilitate notifying an analyzer of a packet that can cause a fault, which is estimated from the type of the error, and of a statistically unusual frequency of occurrence at the time of occurrence of a PDL error. In the present embodiment, therefore, the packet obtaining application 305 displays the information shown in FIG. 13 so that an analyzer can identify the type of the communication failure (failed packet) detected in step S805 when a communication failure log (packet) is displayed.

Then, the analyzer (for example, the PC 102 or 104) retrieves the file of the error job packets in which the PDL error has occurred, which is stored in the HDD 2004, and the application communication failure log created in step S806 from the MFP 101. This enables high-speed fault analysis. A technique for retrieving a file of error job packets and an application communication failure log is implemented by, for example, a protocol such as the File Transfer Protocol (FTP) or Secure Shell (SSH) protocol.

In the present embodiment, therefore, the MFP 101 temporarily stores received packets as a file for every print job, and also stores communication failure information as a log (communication failure log). The MFP 101 deletes data in which no error has occurred in the application among the stored files. When an error occurs during processing of a given print job, the MFP 101 stores the received packets in a storage device, and compares communication failures included in the job packet in which the error has occurred with communication failures included in packets associated with all received print jobs. As a result of the comparison, the MFP 101 extracts a communication failure included only in the job packet in which the error has occurred, and creates a log so that the extracted result can be identified. The MFP 101 further determines a communication failure that can possibly be the cause from the type of the error, and creates a log.

Therefore, instead of storing all packets obtained by the device (MFP 101) in a storage device, only packets associated with application data corresponding to an application in which an error has occurred are stored, leading to a reduction in the capacity of the storage device. Furthermore, the frequency of occurrence of a communication failure included in packets of data corresponding to an application in which an error has occurred and the frequency of occurrence of a communication failure included in normal packets are compared and the result is organized into a log so that an abnormal event can be extracted from among communication failures. Thus, auxiliary information concerning investigation of the cause of a fault can be provided. Moreover, a communication failure that can possibly be the cause of a fault is derived from the type of the error that has occurred in the application and is organized into a log. Thus, auxiliary information concerning investigation of the cause of the fault can be provided.

While in the present embodiment, all packets obtained are organized into communication failure logs, such an organization may not necessarily be performed. For example, among obtained packets, only packets for which the execution of processing using an application (execution of a job) has normally completed but in which a communication failure has occurred may be stored as a communication failure log.

Second Embodiment

A second embodiment of the present invention will now be described. In the first embodiment described above, an example of an application in which an error has occurred has been described in the context of the PDL unit 402. In the present embodiment, on the other hand, the occurrence of an error in the data transmission application 404 will be described by way of example. Therefore, in the present embodiment, an error has occurred in an application different from that in the first embodiment, and the same or similar portions in the present embodiment as or to those in the first embodiment described above are assigned the reference numerals shown in FIGS. 1 to 13 and will not be discussed in detail herein.

FIG. 14 is a diagram showing an example of errors that can occur in the data transmission application 404.

In FIG. 14, a "content of data transmission application error" field 1210 shows examples of errors that have occurred when the data transmission application 404 transmits scan data to the mail server 105. A "possible communication failure" field 1220 shows examples of communication failures on a network, which can possibly be the cause of errors. In a case where an error has occurred for a period during which the data transmission application 404 transmits data, the process according to the flowchart shown in FIG. 10 is performed. The processing of steps S801 to S804 is basically the same as that of the first embodiment described above, and will not be discussed herein.

In step S805, the packet obtaining application 305 derives a communication failure estimated from the error (data transmission application error) of the data transmission application 404 that has occurred. Specifically, the packet obtaining application 305 extracts a communication failure from the internally stored information shown in FIG. 14. For example, when the data transmission application error is a transmission timeout, as shown in FIG. 14, it can be estimated that communication failures that can be estimated to be the cause of the data transmission application error may include a communication disconnection, a communication timeout, and a busy state.

Then, in step S806, the packet obtaining application 305 performs a process of organizing communication failures in the error job packets into a log. Specifically, the packet obtaining application 305 extracts the presence of occurrence of the communication failures shown in FIG. 6 for all the error job packets, and organizes the extracted results into an application communication failure log file. The information stored as a log includes, for example, as in the processing of step S504, acquisition date and time, protocol information, and the type of communication failure. The protocol information includes information capable of identifying a network application. The packet obtaining application 305 further performs the following processes: the packet obtaining application 305 writes the communication failure exhibiting an abnormal occurrence tendency, which is extracted (estimated) in step S804, and the communication failure estimated to be the cause of the data transmission application error, which is extracted in step S805, in the application communication failure log so that the two types of communication failures can be individually identified.

Accordingly, also in a case where an error has occurred in the data transmission application 404, advantages similar to those described in the first embodiment can be achieved.

Third Embodiment

A third embodiment of the present invention will now be described. In the first embodiment described above, in step S802 of FIG. 10, a comparison in terms of the number of packets is performed to determine whether or not a communication failure log is available for comparison. In the present embodiment, on the other hand, other conditions such as an elapsed time, as well as the number of packets, are also taken into consideration to determine whether or not a communication failure log is available for comparison. Therefore, the present embodiment is mainly different from the first and second embodiments described above in that an operation different from that in the first and second embodiments is performed to determine whether or not a communication failure log is available for comparison. Thus, in the present embodiment, the same or similar portions as or to those of the first and second embodiments described above are assigned the reference numerals shown in FIGS. 1 to 14 and will not be discussed in detail herein.

In step S802 of FIG. 10, the packet obtaining application 305 checks the number of packets in communication failure logs to be compared with communication failures in error job packets. If the number of packets in communication failure logs to be compared with communication failures in error job packets is small, the reliability with which the cause of error is determined from a result of the comparison between the communication failures in the communication failure logs and the communication failures in the error job packets is low. Thus, communication failure logs are continuously extracted until sufficient reliability for comparison is achieved. Also in the present embodiment, it is assumed that sufficient reliability for comparison is achieved when the number of packets in communication failure logs to be compared with communication failures in error job packets is more than ten times the number of packets in the error job packets.

The processing of step S802 will be more specifically described. First, the packet obtaining application 305 obtains the total packet number from the file of the error job packets. Then, the packet obtaining application 305 compares the obtained total packet number with the total number of packets internally stored in step S502 of FIG. 5. If the total number of packets internally stored in step S502 shown in FIG. 5 is more than ten times the total packet number of the error job packets as a result of the comparison, the process proceeds to step S804 while skipping step S803.

If the total number of packets internally stored in step S502 shown in FIG. 5 is not more than ten times the total packet number of the error job packets, the process proceeds to step S803. In step S803, the packet obtaining application 305 continues to obtain packets. When a predetermined time has elapsed since the start of the process of obtaining packets, the process of obtaining packets is stopped even though the total number of internally stored packets is not more than a specified value (ten times). If the number of received packets is more than ten times the number of packets of the error job packets before the predetermined time has elapsed, the process proceeds to step S804.

The process described above ensures that, in addition to the advantages described in the first and second embodiments, a comparison between communication failure logs and error job packets (step S804) is performed without fail.

In the present embodiment, even in a case where the total number of internally stored packets does not reach a specified value, the process of obtaining packets is stopped and proceeds to step S804 if the processing time involved in obtaining packets is longer than a predetermined period of time; however, this is not essential. For example, even in a case where the total number of internally stored packets does not reach a specified value, the process of obtaining packets may be stopped depending on communication services (for example, printing, scanning, copying, etc.). In this case, a communication failure log includes information concerning a communication service.

Fourth Embodiment

A fourth embodiment of the present invention will now be described. In the present embodiment, the determination standard of the determination processing of step S503 shown in FIG. 5 (the determination standard of whether or not a communication failure has occurred) can be modified. Therefore, in the present embodiment, a structure of modifying the determination standard of the determination processing of step S503 shown in FIG. 5 is added to the first to third embodiments described above. Thus, in the present embodiment, the same or similar portions as or to those of the first to third embodiments described above are assigned the same reference numerals as those shown in FIGS. 1 to 14 and will not be discussed in detail herein.

The packet obtaining application 305 checks a predetermined directory of the HDD 2004 at the time of start of the MFP 101 to determine whether or not a configuration file exists in the directory. If it is determined that no configuration file exists in the predetermined directory of the HDD 2004, the packet obtaining application 305 defines a communication behavior to be determined to cause a communication failure according to the rule shown in FIG. 6 described in the first embodiment.

If a configuration file exists in the predetermined directory of the HDD 2004, the packet obtaining application 305 defines a communication behavior to be determined to cause a communication failure according to a rule described in the configuration file.

FIG. 15 is a diagram showing an example of a configuration file. A configuration file is set in advance by a user.

In FIG. 15, a statement part 1301 is a part that defines whether or not each of the activities shown in FIG. 6, which can cause a communication failure, is regarded as an activity that causes a communication failure. The value of each of the activities is set to "YES" or "NO" to determine whether the communication failure caused by that activity has occurred or not, respectively. A statement part 1302 is a part that specifies data in more detail. Packet data is specified byte-by-byte, and it is determined that a communication failure occurs when a packet matching a specified pattern is received. A configuration file is stored in the MFP 101 using a protocol such as FTP or SSH.

Accordingly, in addition to the advantages described in the first to third embodiments, setting of a specific pattern in advance by a user allows more flexible determination of whether or not a communication failure has occurred.

Other Embodiments

The units constituting the image forming apparatus and steps of the analysis method according to the foregoing embodiments of the present invention can be implemented by executing a program stored in a RAM, a ROM, or any other suitable device of a computer. This program and a computer-readable recording medium having the program recorded thereon are also encompassed within the scope of the present invention.

The present invention further includes embodiments relating to, for example, a system, an apparatus, a method, a program, and a storage medium. Specifically, the present invention may be applied to a system including a plurality of devices or may be applied to an apparatus including a single device.

The present invention includes an embodiment in which a program of software implementing the functions of the embodiments described above (in the foregoing embodiments, a program corresponding to the flowcharts shown in FIGS. 5 and 10) is supplied directly or remotely to a system or an apparatus. A computer of the system or apparatus may read and execute the supplied program code to achieve the functions of the embodiments. This is also encompassed within the scope of the present invention.

Therefore, program code installed in the computer so that the computer can implement the functional processing of the present invention also constitutes an embodiment of the present invention. That is, a computer program for realizing the functional processing of the present invention also falls within the scope of the present invention.

In this case, object code, a program executed by an interpreter, script data supplied to an OS, or any other form may be used as long as the function of a program is provided.

Examples of recording media for supplying the program may include a floppy (registered trademark in Japan) disk, a hard disk, an optical disk, a magneto-optical (MO) disk, a CD-ROM, a CD recordable (CD-R), and a CD rewritable (CD-RW). The examples may further include a magnetic tape, a non-volatile memory card, a ROM, and a digital versatile disc (DVD) (including DVD-ROM and DVD-R).

Alternatively, the program may be obtained by accessing a homepage on the Internet using a browser of a client computer. In this case, a computer program according to the present invention or a compressed file including an automatic installation function is downloaded from the homepage to a recording medium such as a hard disk to thereby obtain the program.

In an embodiment of the present invention, program code of a program according to the present invention may be divided into a plurality of files and the files may be downloaded from different homepages. That is, a WWW (World Wide Web) server that allows a plurality of users to download a program file for achieving the functional processing of the present invention using a computer is also encompassed within the scope of the present invention.

In another embodiment of the present invention, a program according to the present invention may be encrypted and stored on a storage medium such as a CD-ROM for distribution to a user so that a user who meets a predetermined condition is allowed to download key information for decryption from a homepage via the Internet. The downloaded key information may be used to execute the encrypted program and install the program into a computer to realize the functional processing of the present invention.

In still another embodiment of the present invention, a computer executes a read program to realize the functions of the embodiments described above. In still another embodiment of the present invention, an OS or the like running on the computer may execute part of or the entirety of actual processing according to the instruction of the program to achieve the functions of the embodiments described above.

In a further embodiment of the present invention, the functions of the embodiments described above may be achieved by the following processes. A program read from a recording medium is written in a memory of a function extension board placed in the computer or a function extension unit connected to the computer, and thereafter a CPU or the like of the function extension board or the function extension unit executes part of or the entirety of actual processing according to the instruction of the program.

The embodiments described above are merely specific examples of implementing the present invention, and are not to be construed as limiting the technical scope of the present invention. That is, the present invention can be implemented in a variety of forms without departing from the technical concept or principal features thereof.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-289047 filed Nov. 6, 2007, which is hereby incorporated by reference herein in its entirety.

What is claimed is:

1. An image forming apparatus comprising:
an obtaining unit configured to obtain packets by executing an application used to process a job;

a determining unit configured to determine whether or not the packets obtained by the obtaining unit include a failed packet;

a storage unit configured to store, when the determining unit determines that the obtained packets include a failed packet, the failed packet in a memory;

a comparing unit configured to compare, when an error has occurred during the execution of the application used to process a job, a tendency of occurrence of packets obtained by executing the application with a tendency of occurrence of packets that are determined to be failed packets and that are stored by the storage unit when the execution of the application has been normally completed; and a detecting unit configured to detect, from among the packets obtained by executing the application, types of packets having a different tendency of occurrence from the tendency of occurrence of the packets that are determined to be failed packets on the basis of the comparison performed by the comparing unit and that are stored by the storage unit when the execution of the application has been normally completed, wherein the detecting unit detects, in accordance with a type of the error that has occurred during the execution of the application, a type of a packet that can cause the error.

2. The image forming apparatus according to claim 1, further comprising a display unit configured to display the packets stored by the storage unit so that the packets having the types detected by the detecting unit are distinguishable.

3. The image forming apparatus according to claim 1, wherein when an error has occurred during the execution of the application used to process a job, the comparing unit does not perform the comparison in a case where the number of packets that are stored by the storage unit and that are obtained by executing the application is less than or equal to a threshold value, and performs the comparison in a case where the number of packets that are stored by the storage unit and that are obtained by executing the application exceeds the threshold value.

4. The image forming apparatus according to claim 1, wherein when an error has occurred during the execution of the application used to process a job, the comparing unit does not perform the comparison in a case where the number of packets that are stored by the storage unit and that are obtained by executing the application is less than or equal to a threshold value, and performs the comparison in a case where a predetermined time has elapsed.

5. The image forming apparatus according to claim 1, further comprising:

a saving unit configured to save the packets obtained by the obtaining unit in the memory on a job-by-job basis; and a deleting unit configured to delete a packet saved by the saving unit when a job associated with the packet saved by the saving unit has been correctly completed.

6. An analysis method comprising:

obtaining packets by executing an application used to process a job;

determining whether or not the obtained packets include a failed packet;

storing, when it is determined that the obtained packets include a failed packet, the failed packet in a memory;

comparing, when an error has occurred during the execution of the application used to process a job, a tendency of occurrence of packets obtained by executing the application with a tendency of occurrence of packets that are determined to be failed packets and that are stored in the memory when the execution of the application has been normally completed; and detecting, from among the packets obtained by executing the application, types of packets having a different tendency of occurrence from the tendency of occurrence of the packets that are determined to be failed packets on the basis of the comparison and that are stored in the memory when the execution of the application has been normally completed, wherein in the detecting, a type of a packet that can cause the error is detected in accordance with a type of the error that has occurred during the execution of the application.

7. The analysis method according to claim 6, further comprising controlling so as to display the stored packets so that the packets having the detected types are distinguishable.

8. The analysis method according to claim 6, wherein in the comparing, when an error has occurred during the execution of the application used to process a job, the comparison is not performed in a case where the number of packets that are stored in the memory and that are obtained by executing the application is less than or equal to a threshold value, and the comparison is performed in a case where the number of packets that are stored in the memory and that are obtained by executing the application exceeds the threshold value.

9. The analysis method according to claim 6, wherein in the comparing, when an error has occurred during the execution of the application used to process a job, the comparison is not performed in a case where the number of packets that are stored in the memory and that are obtained by executing the application is less than or equal to a threshold value, and the comparison is performed in a case where a predetermined time has elapsed.

10. The analysis method according to claim 6, further comprising:

saving the obtained packets in the memory on a job-by-job basis; and deleting a packet saved in the memory when a job associated with the packet saved in the memory has been correctly completed.

11. A non-transitory computer-readable storage medium storing a computer program, the computer program causing a computer to execute the analysis method according to claim 6.

* * * * *